ium nitride fibers in high yield.
United States Patent

Komeya et al.

[15] 3,653,830

[45] Apr. 4, 1972

[54] METHOD FOR MANUFACTURING ALUMINUM NITRIDE FIBERS

[72] Inventors: Katsutoshi Komeya, Kawasaki; Hiroshi Inoue, Kawaguchi, both of Japan

[73] Assignee: Tokyo Shibaura Electric Co., Ltd., Kawasaki-shi, Japan

[22] Filed: Apr. 27, 1970

[21] Appl. No.: 32,376

[30] Foreign Application Priority Data

May 8, 1969 Japan..................................44/34812

[52] U.S. Cl.................................................23/192
[51] Int. Cl........................................C01f 7/00, C01b 21/06
[58] Field of Search.............................23/192, 191

[56] References Cited

UNITED STATES PATENTS 3,352,637 11/1967 Heymer et al.......................23/192 X
3,427,373 2/1969 Matsuo et al.......................23/192 X
3,542,521 11/1970 Kulling et al........................23/92 X
3,551,101 12/1970 Matsuo et al..........................23/192

OTHER PUBLICATIONS

Chem. Abs, Vol. 69, Abstract 73508f, Pletyushkin et al. (1968)

Primary Examiner—Oscar R. Vertiz
Assistant Examiner—Charles B. Rodman
Attorney—Kemon, Palmer & Estabrook

[57] ABSTRACT

A method for manufacturing aluminum nitride fibers which comprises heating a mixture of aluminum nitride powders and aluminum powders to a temperature of 580° to 1,000° C. in an atmosphere consisting of nitrogen or ammonia gas with addition of halogens which creates an exothermic nitrification of aluminum heating the charge to above 2,000° C. and forming aluminum nitride fibers in high yield.

5 Claims, No Drawings

METHOD FOR MANUFACTURING ALUMINUM NITRIDE FIBERS

BACKGROUND OF THE INVENTION

The present invention relates to a method for easily manufacturing aluminum nitride fibers in good yield. In recent years, aluminum nitride fibers have come to be widely used as a reinforcing material to reinforce the mechanical strength of nitride ceramics. The aluminum nitride in particular promises favorable high temperature applications due to its excellent thermal and mechanical properties.

There have heretofore been attempted a variety of approaches to the formation of aluminum nitride fibers. These approaches may be broadly classified into the following two categories: (1) a process of taking advantage of the subliming nature of aluminum nitride, which comprises heating aluminum nitride to a high temperature of approximately 2,000° C. and causing fibrous aluminum nitride to solidify on to the inner wall surface of the low temperature zone of a furnace by maintaining a temperature gradient therein, and (2) a process which comprises starting with a mixture of aluminum powders and aluminum halide powders, heating the mixture to a temperature of 800° to 1,000° C. in streams of nitrogen gas to form fibrous aluminum nitride. However, the prior art methods have the drawbacks that with the process (1), there are required exceedingly high temperatures and with the process (2), there are drawbacks that very hygroscopic and industrially disadvantageous aluminum halides must be employed, and that considerable amounts of aluminum halides are required to prevent the aluminum from melting and aggregating together.

DETAILED DESCRIPTION OF THE INVENTION

The present invention has been accomplished to eliminate the drawbacks encountered with the aforesaid conventional methods, and provide a method for manufacturing aluminum nitride fibers at lower temperatures and in higher yields than realized in the past. Namely, the object of the invention is to offer a method for manufacturing aluminum nitride fibers which comprises heating a mixture of aluminum nitride powders and aluminum powders to a temperature of 580° to 1,000° C. in an atmosphere consisting of halogen gas, nitrogen and/or ammonia gas. More particularly the method of the invention comprises placing a starting material prepared from powders of an aluminum nitride-aluminum system (the proportion of aluminum is limited to less than 60 percent by weight of the total weight of the system) in a vessel having great resistance to heat and thermal shocks, and heating the mixture to a temperature of 580° to 1,000° C. in mixed streams of halogen gas and at least one gas selected from the group consisting of nitrogen gas and ammonia gas, for example, chlorine in proportions of less than 50 mol percent of the total volume of the mixed gases. The exothermic nitrification reaction of aluminum leads to sharp temperature rises, and in consequence the temporary formation of aluminum halides, which, however, is finally converted to aluminum nitride. The aluminum nitride thus formed assumes a fibrous form in any case. The greater the temperature increment due to heat buildup is, the more prominent the formation of said fibers. Since the aforesaid exothermic nitrification reaction of aluminum heats the charged materials to beyond 2,000° C., aluminum nitride fibers can be formed in very high yield. Further, the presence of aluminum nitride hinders the aggregation of melted aluminum powders which might otherwise occur during heating. Momentary temperature rises due to heat buildup caused by said exothermic reaction results in a considerable temperature gradient within a furnace, making aluminum nitride fibers more likely to be formed through evaporation and solidification.

As mentioned above, the present invention uses very stable and inexpensive starting materials, heats the mixture to such comparatively low temperatures as 580° to 1,000° C. in an atmosphere consisting of low cost reaction gases like nitrogen, ammonia and halogens and manufactures aluminum nitride fibers in good yield, so that it offers great industrial advantage. The halogens or chlorine, bromine, fluorine and iodine to be added may be selectively used preferably in proportions of less than 50 mol percent. Addition beyond this limit is undesirable, since the yield of aluminum nitride fibers will decline sharply.

The present invention will be understood more clearly from the examples which follow.

EXAMPLE 1

There were mixed in a V-shaped mixer 60 parts by weight of aluminum nitride powders 5.0 microns in average particle size and 40 parts by weight of scale-like aluminum powders 1.9 microns in average particle size. The mixture was received in a narrow vessel 40 mm. wide, 30 mm. high and 200 mm. long and placed in an electric furnace whose core consisted of a quartz tube and in which there was incorporated a carbonrundum heat element. Heating was conducted while there was introduced into the furnace a mixture of 90 mol percent nitrogen and 10 mol percent chlorine. Temperature was raised stepwise at the rate of 200° C. per hour up to 650° C. When the mixture was maintained 30 minutes at this temperature there occurred temperature rise due to a rapid exothermic reaction, heating the mixture up to such a high temperature as 2,100° C. Upon completion of the exothermic reaction, the mass was allowed to cool after being kept at that temperature 10 minutes. As a result, there were formed large amounts of fibrous aluminum nitride 0.5 to 2 microns wide and 1 to 10 mm. long in the carbon vessel, on the inner wall surface of the furnace core, particularly near the gas outlet.

There were conducted further experiments substantially in the same manner as in the preceding case excepting that the flow rate of chlorine gas was changed in three steps as 20, 50 and 60 mol percent. It was found that when the flowrate exceeded 50 mol percent, the formation of aluminum nitride fibers sharply decreased.

Substitution of the chlorine gas used in the aforesaid experiment by other halogens, that is, fluorine, bromine and iodine gave the same result as in the case using chlorine. Also replacement of the nitrogen gas used as an atmosphere in the furnace by ammonia gas displayed the same effect as obtained by the nitrogen gas.

By way of comparison, there were heated the same raw materials as in the preceding cases to 600° C. in an atmosphere consisting of nitrogen alone. In this case, however, the aluminum nitride thus prepared mostly assumed a form of powders, instead of fibers. And on the surface of said powders were observed only small amounts of fibers.

EXAMPLE 2

There were mixed 50 parts by weight of aluminum nitride powders passing the 325 Tyler mesh and 50 parts by weight of aluminum powders 1.9 microns in average particle size. The mixture was received in a carbon vessel 20 mm wide, 20 mm high and 200 mm long in inner dimensions and placed in an atmosphere at 700° C. consisting of 70 mol percent nitrogen and 30 mol percent bromine. 34 minutes later, there appeared a nitrification reaction accompanied with a rapid heat build-up, with the resultant formation of aluminum nitride fibers, most of which were 0.5 to 2 microns wide and 1 to 10 mm. long.

In addition to the above experiment, there were conducted further tests to study the conditions under which aluminum nitride fibers could be created, by varying the proportion of raw aluminum nitride and heating temperature. It was found that when the proportion of aluminum nitride decreased to less than 40 percent by weight, the aluminum was softened or melted to be aggregated together at heating to more than 600° C., undesirably presenting difficulties in the occurrence of an exothermic reaction. If heating temperature is raised to 1,000° C. or higher, the aluminum is likely to be melted or flow on to the surface of the charged mass, so that said temperature should preferably be kept at a level below 1,000° C. Also temperatures of less than 580° C. are unsuitable, because there does not result any exothermic nitrification reaction of aluminum.

Substitution of part of raw aluminum nitride by other heat resistant materials, for example, silicon nitride or alumina which will not harmfully affect the nitrification reaction of aluminum still produces aluminum nitride fibers as in the aforementioned cases.

We claim:
1. A method for manufacturing aluminum nitride fibers which comprises:
   A. providing a powder mixture consisting essentially of about 40 to 60 percent by weight of powdered aluminum nitride and the remainder powdered aluminum metal,
   B. providing a gas mixture of a halogen gas selected from the group consisting of chlorine, bromine, fluorine and iodine with a second gas selected from the group consisting of nitrogen and ammonia, said mixture containing about 10 to 50 mol percent of halogen gas.
   C. heating said powder mixture to a temperature of between about 580° to 1,000° C. in an atmosphere of said gas mixture to initiate an exothermic nitrification reaction of the aluminum of said powder mixture, and
   D. permitting the exothermic reaction heat to raise the temperature of the reaction mass to at least 2,000° C.

2. The method of claim 1 wherein said powdered mixture is contained in a carbon vessel during said steps C and D and aluminum nitride fibers are recovered following step D of a size about 0.5 to 2 microns wide and 1 to 10 mm. long.

3. The method of claim 1 wherein a portion of said aluminum nitride is replaced with powdered silicon nitride or alumina.

4. The method according to claim 1 wherein the proportion of the raw aluminum nitride powders is 60 percent by weight of the total weight of the mixed powders, the halogen used consists of 10 mol percent chlorine gas on the basis of the total volume of the mixed gases, and heating is carried out at a temperature of 650° C.

5. The method according to claim 1 wherein the proportion of the raw aluminum nitride powders is 50 percent by weight of the total weight of the mixed powders, the halogen used consists of 30 mol percent bromine gas on the basis of the total volume of the mixed gases and heating is conducted at a temperature of 650° C.

* * * * *